United States Patent [19]

Kiuchi

[11] Patent Number: 4,738,173

[45] Date of Patent: Apr. 19, 1988

[54] SHEARING IN PUNCH PRESS AND DIE THEREFOR

[75] Inventor: Yoshinori Kiuchi, Hacienda Hts., Calif.

[73] Assignee: U.S. Amada Limited, Buena Park, Calif.

[21] Appl. No.: 925,929

[22] Filed: Nov. 3, 1986

[51] Int. Cl.$^4$ ............................................. B26D 5/02
[52] U.S. Cl. ............................................. 83/34; 83/49;
83/556; 83/620; 83/916
[58] Field of Search ............... 83/34, 49, 556, 620,
83/622, 916

[56] References Cited

U.S. PATENT DOCUMENTS

| | | | |
|---|---|---|---|
| 4,483,227 | 11/1984 | Camisa | 83/620 X |
| 4,534,255 | 8/1985 | Salvagnini | 83/620 X |
| 4,674,373 | 6/1987 | Kuppinger | 83/49 |
| 4,696,211 | 9/1987 | Bitzel | 83/49 |

Primary Examiner—Frank T. Yost
Attorney, Agent, or Firm—Wigman & Cohen

[57] ABSTRACT

A method for shearing a plate-like workpiece using a punch press includes providing a punch having two adjacent blades disposed at a specified angle with respect to one another and a die having two blades corresponding to the blades of the punch. The punch and die are adjusted so that one of the blades on one of the punch and die will not mate with the corresponding blade on the other of the punch and die, and the other blade on one of the punch and die will mate with the corresponding blade of the other of the punch and die. The punch and die are brought together to shear the workpiece between the mating, corresponding blades of the punch and die. In one embodiment the blades of the punch are fixed on the base of the punch so as to be fixed with respect to one another. In a second embodiment, the punch is divided into two parts by a sliding surface which bisects the specified angle between the blades of the punch, so that the blades of the punch are longitudinally slidable with respect to one another.

5 Claims, 9 Drawing Sheets

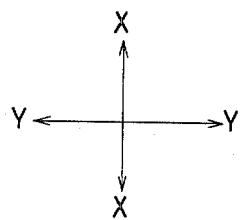

SHEARING IN PUNCH PRESS AND DIE THEREFOR

BACKGROUND OF THE INVENTION

1. Field of the Invention

The present invention relates to a shearing method using a punch press and to a die used therein, and more particularly to a half-cutting shearing method, wherein the shearing cut is made without the full length of a blade.

2. Description of the Prior Art

Conventionally, a numerically-controlled, turret type punch press is used in obtaining a plurality of items such as a chassis for electronic equipment cut from standard-sized plate. With this type of equipment, many types of punch and die pairs are provided on upper and lower turrets, and these are successively exchanged to process the desired holes in the plate at the desired positions. Finally, the process of cutting out the contoured sections is performed using the nibbling method.

This method has considerable merit in that the semi-processed goods are automatically obtained by processing the desired holes within the area of the plate in a single clamping operation but, on the other hand, the following negative points exist. Specifically, because of the fact of cutting out contours by means of overlapping punched holes, such as round holes and square holes, in the nibbling process, the yield from the plate is low. Further, in the case of round holes, the result is unsatisfactory because of the wave form at the edge of the cut.

SUMMARY OF THE INVENTION

In view of the foregoing limitations and shortcomings of the prior art devices, as well as other disadvantages not specifically mentioned above, it is a primary objective of this invention to provide a shearing method in which no punching chips are produced, thereby increasing the yield from the workpiece.

It is another object of this invention to provide a shearing method in which shearing takes place along a relatively long straight line, so that no wave forms are produced at the edges of the cut, thereby improving the quality of the product produced.

Yet another object of the invention is to provide a shearing method in which shearing can be completed with only a single clamping of the workpiece.

Briefly described, the aforementioned objects are accomplished according to the invention by providing a half-cutting shearing method, wherein the shearing cut is made without the full length of the blade, similar to the cutting of a piece of cloth with a pair of scissors. According to the invention a punch provided with a pair of blades, which are directed along the X and Y axes of the punch press, and a die having a corresponding pair of blades are utilized as a pair. As required, one of the punch or the die is rotated so that one of the punch blades assumes a position at which it will not engage the corresponding blade of the other of the punch or die, and thus half-cutting is performed.

BRIEF DESCRIPTION OF THE DRAWINGS

This and other objects, features, and advantages of the present invention will become more apparent from the following description of a preferred embodiment taken in conjunction with the accompanying drawings, in which.

DESCRIPTION OF THE PREFERRED EMBODIMENT

Following is a description of a preferred embodiment of the present invention, with reference to the drawings.

Figure 1:
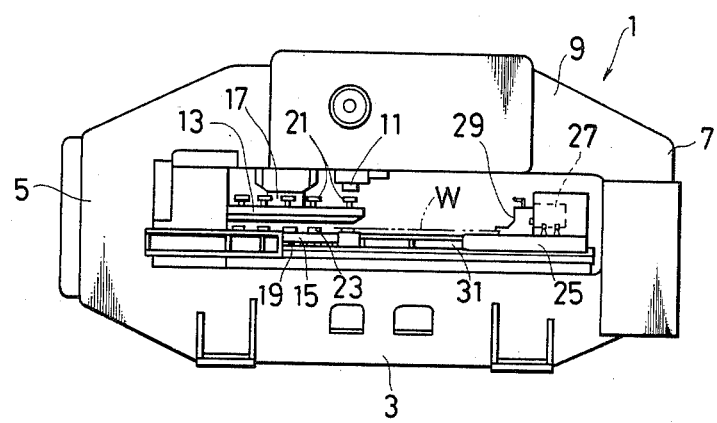
FIG. 1 is a front elevation of a punch press as an example of an embodiment of the present invention.
Figure 2:
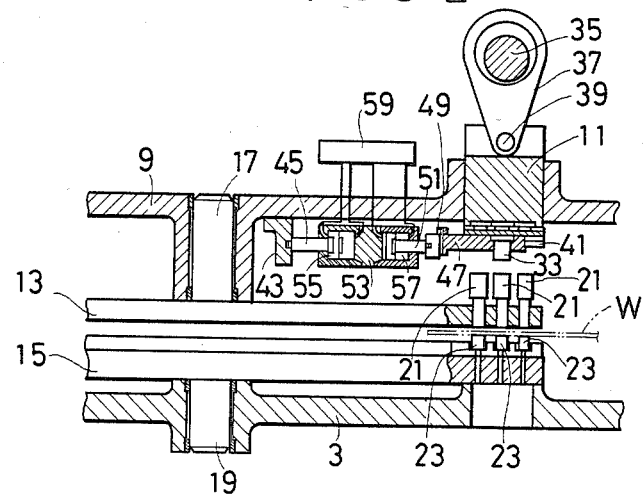
FIG. 2 is an enlarged sectional drawing of the area around the striker of the punch press of FIG. 1.
Figure 3:
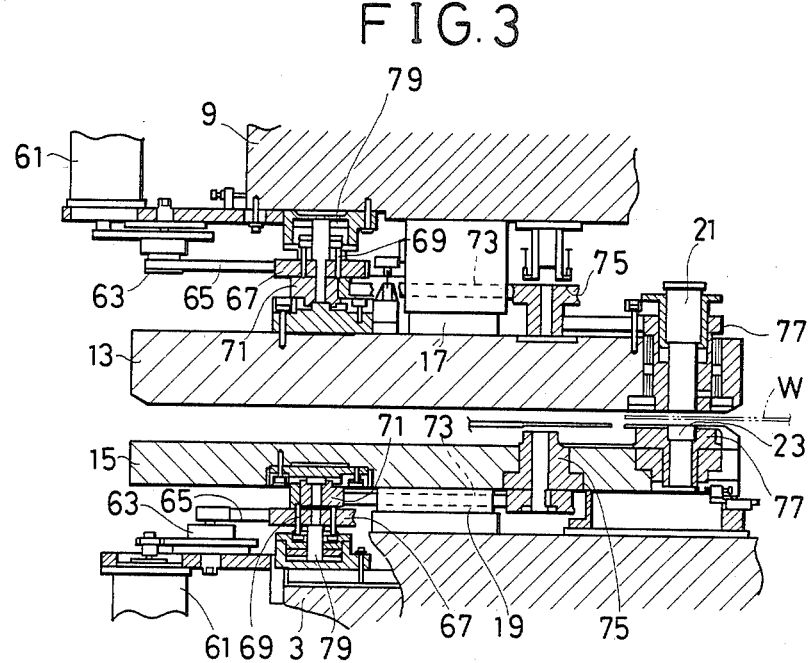
FIG. 3 is an enlarged sectional drawing of the area around the rotary punch and die mechanism of the same punch press of FIG. 1.

Now referring to FIGS. 1, 2, and 3, in FIG. 1, a gate type turrent punch press 1 is provided with a pair of side frames 5, 7 on a base 3. An upper frame 9 is erected on the side frames 5 and 7 to form a gate.

A ram 11 and an upper turret 13 on the upper frame 9 of the punch press 1 are installed to rotate freely around a shaft 17, while a lower turret 15 on the base 3 is installed to rotate freely around a shaft 19. A plurality of punches 21 are mounted on the upper turret 13, while a plurality of dies 23 are mounted on the lower turret 15, corresponding to the punches 21.

A numerically controlled first carriage 25 is provided in the space between the base 3 and the upper frame 9 so that this first carriage 25 is freely movable and positionable in the direction to advance toward and retreat from (Y axis direction) the upper turret 13 and the lower turret 15.

A second carriage 27, which can be moved and positioned by numerical control in the x-axis direction relative to the inside of the first carriage 25 (the direction perpendicular to the surface of the drawing), is provided above the first carriage 25. A clamp 29 is provided on the inside of the second carriage 27 for clamping a workpiece W such as a standard-dimension plate.

In addition, the first carriage 25 is guided on a rail 31 provided on the base 3 and the second carriage 27 is guided on the first carriage 25.

In FIG. 2, a striker 33 which can be freely positioned in a plurality of positions in the radial direction of the upper turret 13 is shown provided on the lower surface of the ram 11.

Specifically, the striker 33, which is elevatingly driven through a connecting rod 37 and a shaft pin 39 from a crankshaft 35, is guided in a horizontal slide channel 41 provided at the lower edge of the ram 11, in a freely movable manner.

The edge of a first piston rod 45 is secured by a bracket 43 to the lower surface of a part of the upper frame 9 close to the upper turret shaft 17. The left edge of a slider 47, which moves in the transverse direction in FIG. 2 within the slide channel 41, mates with the right edge of a second piston rod 51 through a longitudinal slide channel 49.

The first piston rod 45 and the second piston rod 51 are engagingly installed on a left cylinder chamber 55 and a right cylinder chamber 57 respectively of a serial double headed hydraulic cylinder 53. The hydraulic pressure is separately introduced to the respective left and right cylinder chambers 55, 57 from, for example, a solenoid valve 59.

FIG. 3 shows the mechanism which, as required, rotates the punches 21 and dies 23 provided on the upper turret 13 and the lower turret 15 respectively and individually to a desired angle.

Specifically, a pulley 63 which is driven by a motor 61, which may be, for example, a pulse motor, provided on a section of the upper frame 9, transmits this rotation to a second pulley 67 through a belt 65. A pin clutch 69 which penetrates the second pulley 67 transmits the rotation to a third pulley 71 provided on the upper turret 13. In addition, rotation is transmitted through a belt 73 and a fourth pulley 75 from the third pulley 71, and the punches 21 are freely rotated through a desired angle in the desired direction through a fifth pulley 77 for the punches 21 positioned below the striker 33.

The pin clutch 69 is driven by the hydraulic cylinder 79 to engage and disengage the second pulley 67 with the third pulley 71. On completion of the rotary movement, the punch 21 is stopped by a means (not shown on the drawing) so that it does not rotate during the striking operation.

The rotation of the die 23 is also conducted in a freely rotating manner by means of the same type of mechanism. Equivalent reference numbers are attached to identify the equivalent functional members. A detailed explanation is omitted here.

Figure 4A:
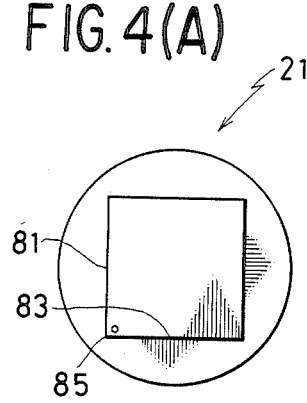
FIGS. 4(A), 4(B), and 4(C) show three views of one embodiment of the punch of the present invention.
Figure 4B:
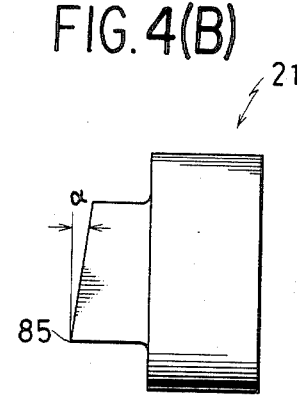
Figure 4C:
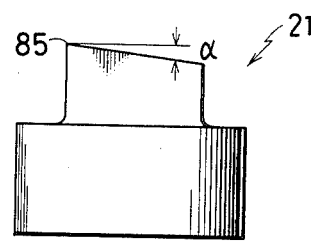
Figure 5A:
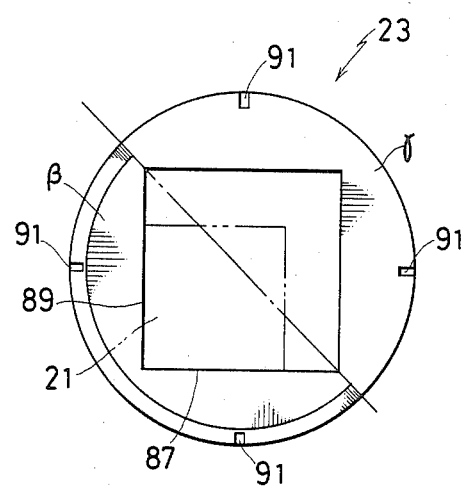
FIGS. 5(A), 5(B), and 5(C) show three views of an embodiment of the die of the present invention.
Figure 5B:
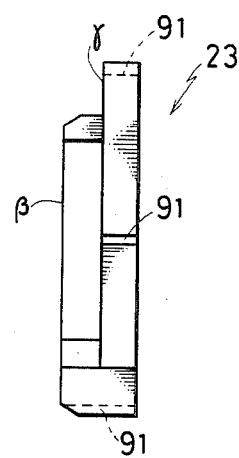
Figure 5C:
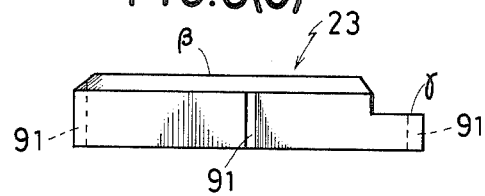

Next, a punch and die according to the first embodiment are shown in FIG. 4 and FIG. 5, which are installed in the abovementioned type of punch press 1, to implement the half-cutting shearing method of the invention.

FIG. 4 shows three views of the punch 21 having a pair of blades 81, 83, formed on two adjacent sides with right angles between the two adjacent sides, and placed in an inverted status on a bench top. The section of right angles between the two blades 81, 83 is a highest section 85 when in inverted status (the black point marked at the corner of the punch 21).

Expressed in other words, section 85 does the initial shearing operation by initially engaging with a pair of blades 87, 89 of the horizontal, even-heighted die 23 of FIG. 5. In FIG. 4, a shearing angle (alpha) is provided on the blades 81, 83 toward the lower section from the highest section 85.

Next, an explanation will be given of the three views of the die 23 shown in FIG. 5. A horizontal, even-heighted section (beta) is provided on the pair of blades 87, 89 of this embodiment of the die 23. The sections other than the knife blades 87, 89 are a horizontal, even-heighted section (gamma) which is one stage lower. Furthermore, the total length of the blades 81, 83 of punch 21 having the shearing angle (alpha), does not contact the horizontal, even-heighted section (gamma) of die 23 which is one stage lower, even when the shearing action is completed. A plurality of channels 91 for rotational positioning of die 23 is provided at 90 degree intervals on the outer periphery of the die 23.

Figure 6:
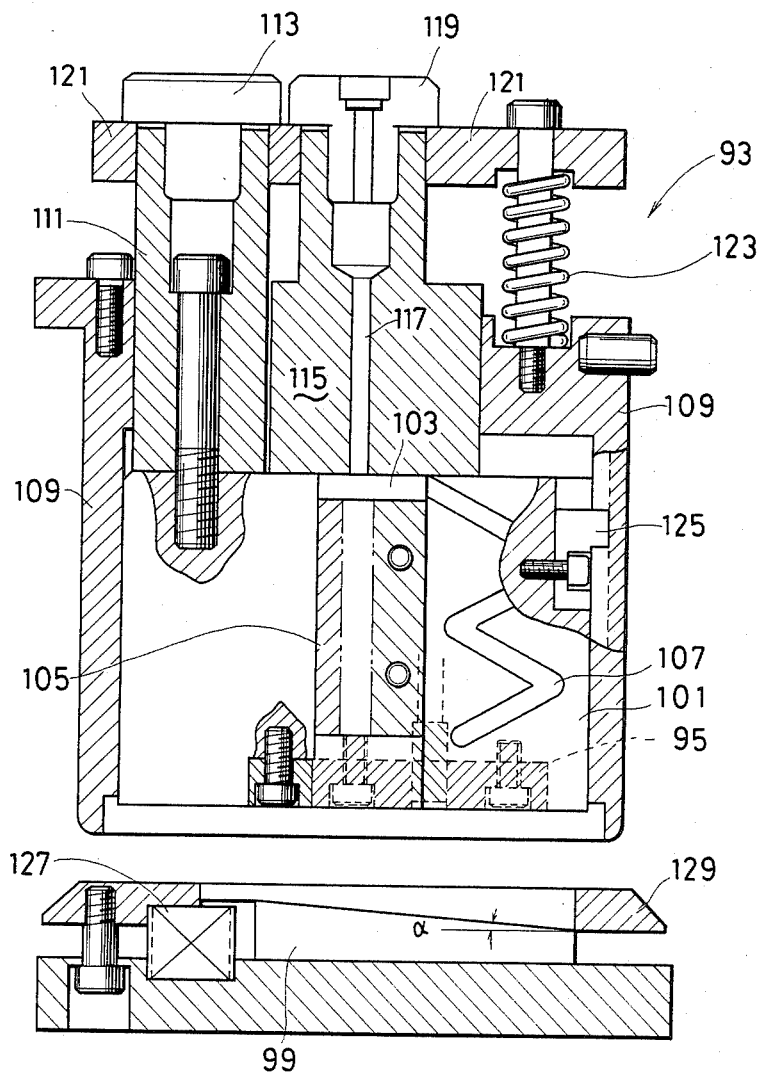
FIG. 6 is a front elevation sectional view of a second embodiment of the punch and die of the present invention.
Figure 7:
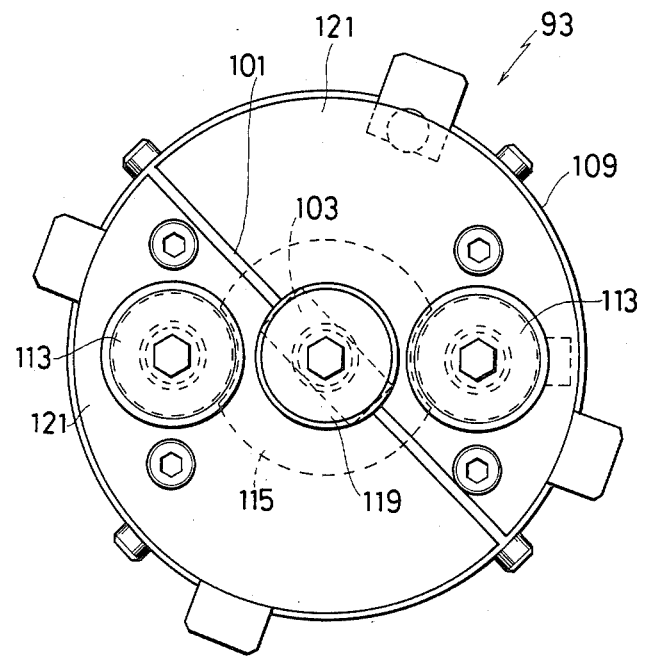
FIG. 7 is a sectional plan view of the punch of FIG. 6.
Figure 8:
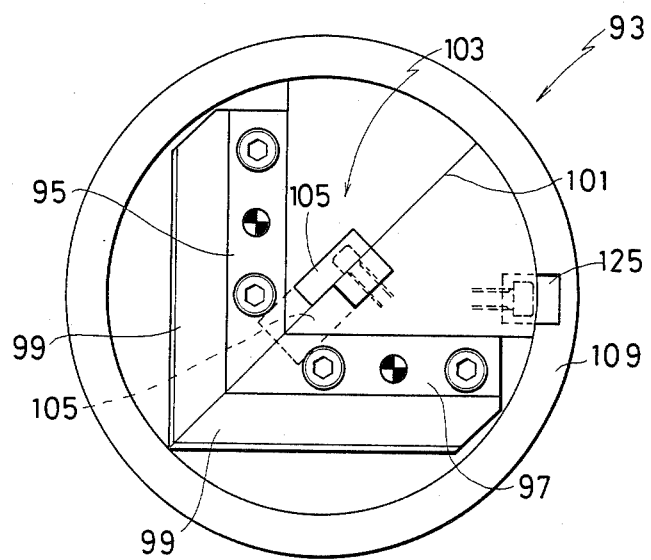
FIG. 8 is a bottom plan view of the punch of FIG. 6.

FIGS. 6, 7, and 8 show a punch and die used in a second embodiment of the present invention.

A punch 93 of this second embodiment is provided with a pair of blades 95, 97 which are contiguously positioned at right angles, which form horizontal blades without a shear angle. Instead, the die 99 maintains a low shear angle (alpha) in accordance with the slope away from a highest right angles section.

In addition, the punch 93 is divided into two sections by a sliding surface 101, which bisects the right angled section of the blades 95, 97. A longitudinal channel 103 is provided at almost dead center of the sliding surface 101 which is engaged in a freely sliding manner by a pair of slide keys 105, 105 with L-shaped cross sections which are embedded in both bisected sections.

As shown in FIG. 6, an oil channel 107, with its upper end opening into a longitudinal channel 103, is provided in the sliding surface 101.

The punch 93 which is divided into two sections is housed in the cylindrical aperture of a punch guide 109 in a slidingly engaged manner. A head member 113 which is struck by the striker 33 through a strut 111 is provided on each of the respective divided sections.

A large diameter support 115 is provided extending over the sliding surface 101 of the divided punch 93 at the center section of the head member 113. A head member 119 is also provided at the end of the support 115.

A lubricating orifice 117 which supplies oil to the longitudinal channel 103 and the oil channel 107 is provided in the center of the large diameter support 115. In addition, the pair of head members 113, 113 on the divided punch 93 and the head member 119 on the large diameter support 115 are all mounted on a support plate 121. The support plate 121 is energized in the upward direction by a lift spring 123 on the top of the punch guide 109.

A suitable rotary positioning pin and a hook or the like opposing the upper plate 13 are provided at the upper periphery of the punch guide 109. A locking key 125 is provided between the sliding parts on the inside of the punch 93.

A strip plate 129 with a plurality of strip springs 127 is provided on the periphery of the die 99, energized in the upward direction.

In the half-cutting method for the embodiments of the present invention, wherein the punch press 1 with the configuration shown in FIGS. 1, 2, and 3 is equipped with the first embodiment of the punch and die, as shown in FIGS. 4 and 5, or equipped with the second embodiment of the punch and die, as shown in FIGS. 6, 7, and 8, the process is carried out according to the following description.

Figure 9A:
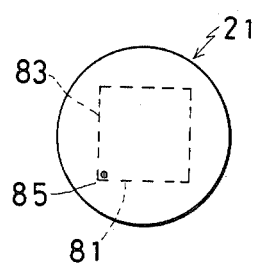
FIGS. 9(A)–9(F) are explanatory drawings showing the rotating position of the punch shown in FIGS. 4(A), 4(B), and 4(C) and the die shown in FIGS. 5(A), 5(B), and 5(C).
Figure 9B:
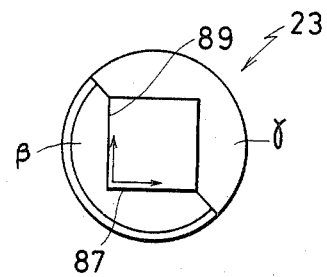
Figure 9C:
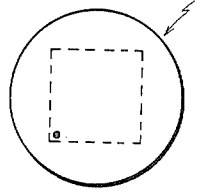
Figure 9D:
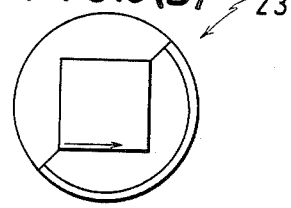
Figure 9E:
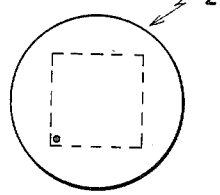
Figure 9F:
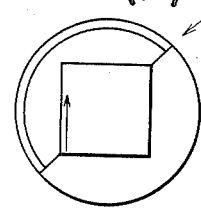

In FIGS. 9A, 9C, and 9E, a black point is marked on the highest right-angles corner on the plan view of the punch 21 shown in FIG. 4, viewed from the top. FIGS. 9B, 9D, and 9F are the plan view of the die 23 shown in FIG. 5, viewed from the top. In the horizontal, even-heighted section (beta), the blades 87 and 89 are shown as two adjacent sides with right angles therebetween.

Figure 10:
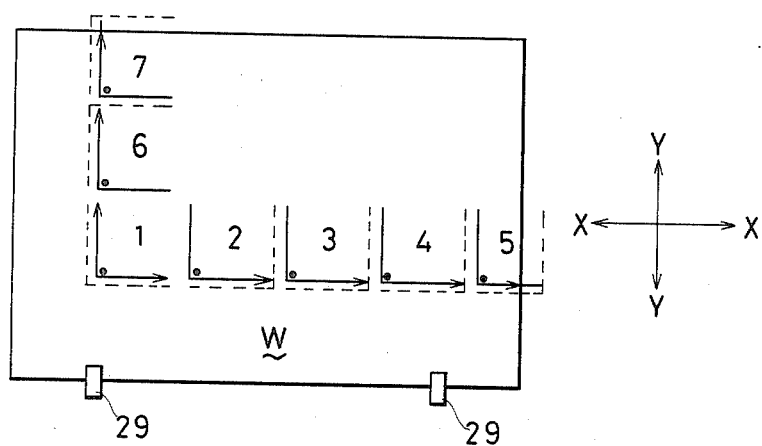
FIG. 10 is an explanatory drawing of the procedure used when advancing the half-cutting along the edge of the material from the cut-away corner section in the present invention.

The workpiece W is clamped in the clamp 29 shown in FIG. 10. The workpiece W is positioned in the Y-axis direction and the half-cutting operation is carried out using the punch 21 and the die 23 as shown in FIG. 10, wherein initially, processing of the right-angled, two-sided section as shown at (1) can be carried out, where the solid line shows the two blades of the punch and the dotted line shows the two blades of the die.

The shearing progresses in the direction shown by the arrows on the solid line.

Next, the die is rotated 90 degrees in the clockwise direction and the half-cutting shear is carried out on the one side only on the extension in the X-axis direction of the process (2). In this case, shearing in a combination of FIG. 9C and FIG. 9D is carried out, with no blade in the die to correspond to the blade 83 of the punch 21, so the shearing is not performed at this section.

In this way the half-cutting is carrid out in the same way for (3), (4), and (5).

Next, the workpiece W is positioned in the process position for (6). Only the die 23 is rotated to the status at FIG. 9F and the half-cutting is carried out on the shear line in the direction of the Y-axis in (1).

In this case also, because there is no die under the blade 81 of the punch 21, as for the case (2), no shearing is carried out in the direction along the X-axis.

Next, if the half-cutting in (7) is carried out on the Y-axis line in the same way as for (6) the workpiece W can be divided into the desired two parts without waste.

The half-cutting explained with reference to FIG. 10 is conducted, in the X-axis direction toward the right, while in the Y-axis direction toward the top. Furthermore, as shown in (1) in FIG. 11, shearing is performed along the half-cutting line of the Y-axis direction from the edge of the workpiece W in the X-axis direction. Following this, the shearing proceeds along the half-cutting line in the X-axis direction shown in (2) from the edge in the Y-axis direction, and finally, the shearing may be carried out simultaneously at both edges at right angles, at the position shown in (3).

FIG. 12 is an example of the method of cutting out a comparatively large rectangle from the center of a plate of, for example, standard-sized material while using the half-cutting shear.

In this case also, the punch blade is shown within the circle as the solid line, and the die blade as the dotted line. A black dot is marked at the highest part on the punch blade, and the arrows indicate the direction in which the shearing progresses.

Also, in the drawing, the fact that the standard-sized material descends progressively from A to B to C and ascends progressively from D to E to F, indicates that with respect to A and D respectively the workpiece moves in the X direction. The details of the process are the same as in FIG. 10 and FIG. 11 so further description will be omitted here.

Figure 11:
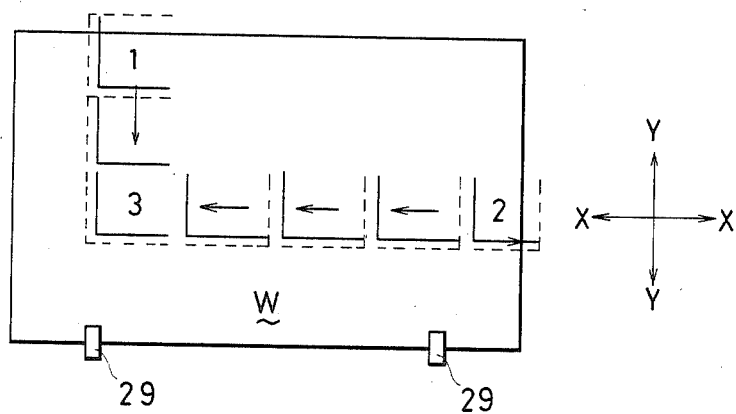
FIG. 11 is an explanatory drawing of the procedure used when advancing toward the cut-away corner section along two edges of the material.
Figure 12A:
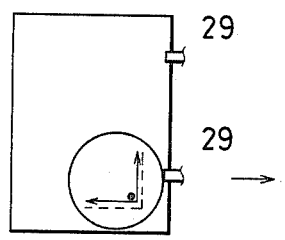
FIGS. 12(A)–12(F) of the procedure used when cutting out a rectangle in the center of the material.
Figure 12B:
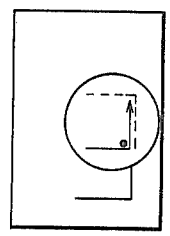
Figure 12C:
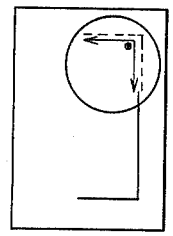
Figure 12D:
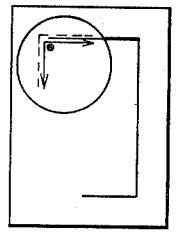
Figure 12E:
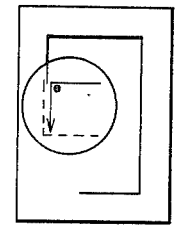
Figure 12F:
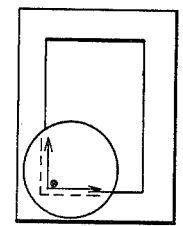

In the second embodiment of the punch and die implemented in the present invention, one of the two blades with right angles therebetween in the punch is not driven, as required, so as to perform a linear half-cutting shear. All the examples of operations in FIGS. 10, 11, and 12 are clearly possible.

With embodiments of the half-cutting method of the present invention and the punch and die using this process, the punching chips as in the conventional nibbling process does not occur, so the yield of material is increased. Also, in continuing along a relatively long straight line, there are no wave forms produced at the cut of the half-cutting, so the quality of the material is improved.

Especially in the case when all types of through-holes are included in the product, the processing can be completed after only clamping the material once, improving the operating efficiency.

Further, it can be understood that changes can easily be made in the method of utilizing the technical concept of the present invention, and in the embodiment of the punch and die, within a wide range, with no deviation from this technical concept.

What is claimed is:

1. A combination of a punch and die for use in a shearing process by means of a punch press comprising:
    a punch provided with two adjacent blades with a specified angle therebetween;
    a die provided with two blades corresponding to the blades on the punch; and said two blades placed on a horizontal section of even height which is raised a stage higher on the upper surface of the die; and
    mean for changing the relative positions of the blades of said punch and die by rotation of one of said punch and dies around a rotary axis positioned on the bisecting line of the specified angle.

2. The combination of a punch and die for use in a shearing process by means of a punch press of claim 1 comprising:
    a punch divided into two sections by a dividing sliding surface which bisects the specified angle;
    a longitudinal channel on both surfaces of the divided punch sections; and
    a freely sliding slide key, slidingly engaged in the longitudinal channel, embedded in both divided sections.

3. A method for shearing a plate-like workpiece in a punch press comprising the steps of:
    providing a punch having two adjacent blades disposed at a specified angle with respect to one another;
    providing a die having two blades corresponding to the blades of said punch;
    adjusting one of said punch and die so that one of the blades on said one of said punch and die will not mate with the corresponding blade on the other of said punch and die and so that the other of said blades on said one of said punch and die will mate with the corresponding blade on the other of said punch and die;
    positioning the workpiece between said punch and die; and
    bringing said punch and die together to shear said workpiece between said mating, corresponding blades of said punch and die.

4. The shearing method of claim 3 wherein said adjusting step comprises rotating one of said punch and die relative to the other of said punch and die.

5. The shearing method of claim 3 wherein said punch is divided into two parts by a sliding surface which bisects the specified angle between said two blades wherein the step of bringing said punch and die together comprises bringing only one part of said punch together with said die to shear said workpiece between said mating, corresponding blades of said punch and die.

* * * * *